United States Patent
Gao et al.

(10) Patent No.: US 10,007,583 B2
(45) Date of Patent: *Jun. 26, 2018

(54) GENERATING A DATA STRUCTURE TO MAINTAIN ERROR AND CONNECTION INFORMATION ON COMPONENTS AND USE THE DATA STRUCTURE TO DETERMINE AN ERROR CORRECTION OPERATION

(71) Applicant: INTERNATIONAL BUSINESS MACHINES CORPORATION, Armonk, NY (US)

(72) Inventors: Xue Dong Gao, Shanghai (CN); Chang Ping Lu, Shanghai (CN); Todd C. Sorenson, Tucson, AZ (US); Jeffrey R. Steffan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/048,790

(22) Filed: Feb. 19, 2016

(65) Prior Publication Data
US 2016/0170847 A1 Jun. 16, 2016

Related U.S. Application Data

(63) Continuation of application No. 14/259,135, filed on Apr. 22, 2014, now Pat. No. 9,298,541.

(51) Int. Cl.
*G06F 11/00* (2006.01)
*G06F 11/20* (2006.01)
(Continued)

(52) U.S. Cl.
CPC ............ *G06F 11/20* (2013.01); *G06F 11/079* (2013.01); *G06F 11/0727* (2013.01);
(Continued)

(58) Field of Classification Search
CPC .... G06F 11/20; G06F 11/0727; G06F 11/079; G06F 11/0793; G06F 11/1608;
(Continued)

(56) References Cited

U.S. PATENT DOCUMENTS

| 6,973,412 B2 | 12/2005 | King et al. |
| 7,103,789 B2 | 9/2006 | Ahrens, Jr. et al. |

(Continued)

FOREIGN PATENT DOCUMENTS

| GB | 2398405 A | 8/2004 |
| WO | WO2004095304 A1 | 11/2004 |
| WO | WO2009112326 A1 | 9/2009 |

OTHER PUBLICATIONS

L. Spainhower, et al., "IBM S/390 Parallel Enterprise Server G5 Fault Tolerance: A Historical Perspective", IBM J. Res. Develop, vol. 43, No. 5/6, Sep./Nov. 1999, pp. 863-873.

(Continued)

*Primary Examiner* — Joseph D Manoskey
(74) *Attorney, Agent, or Firm* — David W. Victor; Konrad Raynes Davda & Victor LLP

(57) ABSTRACT

Provided are a computer program product, system, and method for generating data structure to maintain error and connection information on components and use the data structure to determine an error correction operation. For each of a plurality of first level components in enclosures connected to second level components, errors at the first level component and a connection between the first level component to one of the second level components are determined and error variables are set to indicate whether an (Continued)

error was reported at the first level component. A data structure is generated indicating connections among the first level components and the second level components. The error variable values and the data structure are used to determine an error correction operation with respect to at least one of the first level component and the connected second level component.

20 Claims, 9 Drawing Sheets

(51) Int. Cl.
    *G06F 11/07*     (2006.01)
    *G06F 11/16*     (2006.01)

(52) U.S. Cl.
    CPC ...... *G06F 11/0793* (2013.01); *G06F 11/1608* (2013.01); *G06F 11/2015* (2013.01); *G06F 2201/85* (2013.01)

(58) Field of Classification Search
    CPC ............. G06F 11/2015; G06F 11/0751; G06F 11/0766; G06F 11/2002; G06F 2201/85
    USPC ................. 714/48, 14, 25, 26, 33, 40, 44
    See application file for complete search history.

(56) References Cited

U.S. PATENT DOCUMENTS

| | | |
|---|---|---|
| 7,379,846 B1 | 5/2008 | Williams et al. |
| 7,516,025 B1 | 4/2009 | Williams et al. |
| 2004/0078711 A1 | 4/2004 | King et al. |
| 2004/0210800 A1 | 10/2004 | Ghislain Gabriel Vecoven et al. |
| 2009/0006902 A1 | 1/2009 | Corcoran et al. |
| 2011/0154097 A1* | 6/2011 | Barlow ............... G06F 11/0727 714/3 |
| 2011/0154115 A1 | 6/2011 | Calkin et al. |
| 2015/0301881 A1 | 10/2015 | Gao et al. |

OTHER PUBLICATIONS

D. C. Bossen, et al., "Power4 System Design for High Reliability", IEEE, 2002, pp. 16-24.

L.C. Alves, et al., "RAS Design for the IBM eServer z900", IBM J. Res. & Dev. vol. 46, No. 4/5, Jul./Sep. 2002, pp. 503-521.

"Fault Tolerate Method Monitor Control Power Supply Computer System Local Voltage Current Temperature Protect Circuit", RD 473019, Abstract, Sep. 10, 2003.

Notice of Allowance dated Dec. 16, 2015, pp. 14, for U.S. Appl. No. 14/259,135, filed Apr. 22, 2014.

\* cited by examiner

GENERATING A DATA STRUCTURE TO MAINTAIN ERROR AND CONNECTION INFORMATION ON COMPONENTS AND USE THE DATA STRUCTURE TO DETERMINE AN ERROR CORRECTION OPERATION

CROSS-REFERENCE TO RELATED APPLICATION

This application is a continuation of U.S. Patent Application No. 14/259,135, filed Apr. 22, 2014, which application is incorporated herein by reference in its entirety.

BACKGROUND OF THE INVENTION

1. Field of the Invention

The present invention relates to a computer program product, system, and method for generating data structure to maintain error and connection information on components and use the data structure to determine an error correction operation.

2. Description of the Related Art

In enterprise storage systems having multiple storage enclosures, accurate field replaceable unit (FRU) isolation is required to determine a source of errors in the enclosures. FRU isolation and error troubleshooting are complicated if heterogeneous storage enclosures from different vendors are deployed that report different error codes.

There is a need in the art for improved techniques for managing errors among heterogeneous computing components and determining error handling and troubleshooting operations in such heterogeneous computing environments.

SUMMARY

Provided are a computer program product, system, and method for generating data structure to maintain error and connection information on components and use the data structure to determine an error correction operation. For each of a plurality of first level components in enclosures connected to second level components, communicating with the enclosure including the first level component to determine errors at the first level component and a connection between the first level component to one of the second level components and setting error variables to indicate whether an error corresponding to the error variable was reported at the first level component. A data structure is generated indicating connections among the first level components and the second level components. The error variable values for the first level components and the data structure indicating the connections are used to determine an error correction operation with respect to at least one of the first level component and the connected second level component for those first level components having error variable values indicating errors.

DETAILED DESCRIPTION

Described embodiments provide techniques to generate a component data structure and information on error variables recorded at first level components in enclosures that connect to second level components and the connections therebetween. With described embodiments, the component data structure is used to determine error correction operations based on a number of first level components connected to one second level component reporting errors. Further, with described embodiments, first level component class interface types may be used to gather the error information from heterogeneous components and enclosures and store in common class error variables that may be used to compare and analyze errors across heterogeneous components using different error codes.

Figure 1:
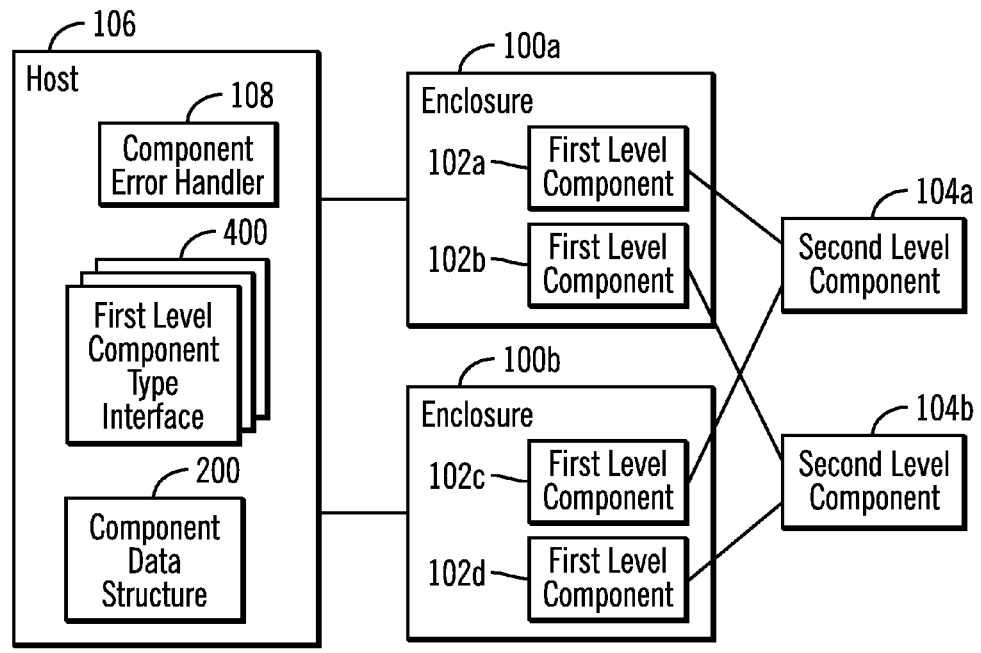
FIG. 1 illustrates an embodiment of an enclosure and component environment.

FIG. 1 illustrates an embodiment of a component environment including a plurality of enclosures 100a, 100b that each include multiple first level components 102a, 102b, 102c, 102d, where each of the first level components 102a, 102b, 102c, 102d is connected to one second level component 104a, 104b. The enclosures 100a, 100b may comprise storage or system enclosures having a motherboard, connection, etc., and the first level components 102a, 102b, 102c, 102d may comprise any electrical component in the enclosure, such as an adaptor, computational component, Input/Output (I/O) device, power supply unit (PSU), etc., that is connected to at least one second level component 104a, 104b, which may comprise a connected device, another adaptor, a power distribution unit (PDU), computational component, I/O device, etc. The second level components 104a, 104b may be external to the enclosures 100a, 100b as shown in FIG. 1 or within the enclosures 100a, 100b.

Further, although a certain number of enclosures, first level components and second level components are shown in FIG. 1 there may be any number of these elements and connections therebetween.

A host 106 is connected to the enclosures 100a, 100b and includes a component error handler 108 to gather error information from the first level components and provide error troubleshooting recommendations based on errors detected for the first level components 102a, 102b, 102c, 102d, where errors may be occurring within the first level components 102a, 102b, 102c, 102d or at the connected second level components 104a, 104b. The host 106 further includes multiple first level component type class interfaces 400, one for each type of first level component 102a, 102b, 102c, 102d, such as if they are heterogeneous components from different or the same vendor. The component error handler 108 invokes interfaces and methods of the first level component type interface 400 for the specific enclosure or first level component 102a, 102b, 102c, 102d to which it communicates to gather error information. The component error handler 108 uses the determined errors to generate a component data structure 200 having information on the gathered errors and connection and relationship of enclosures 100a, 100b, first level components 102a, 102b, 102c, 102d, and second level components 104a, 104b.

In FIG. 1, the host 106 and its elements 108, 200, 400, are shown external to the enclosures 100a, 100b. In alternative embodiments, one or more of the host 106 components may be included in one of the enclosures 100a, 100b.

Figure 2:
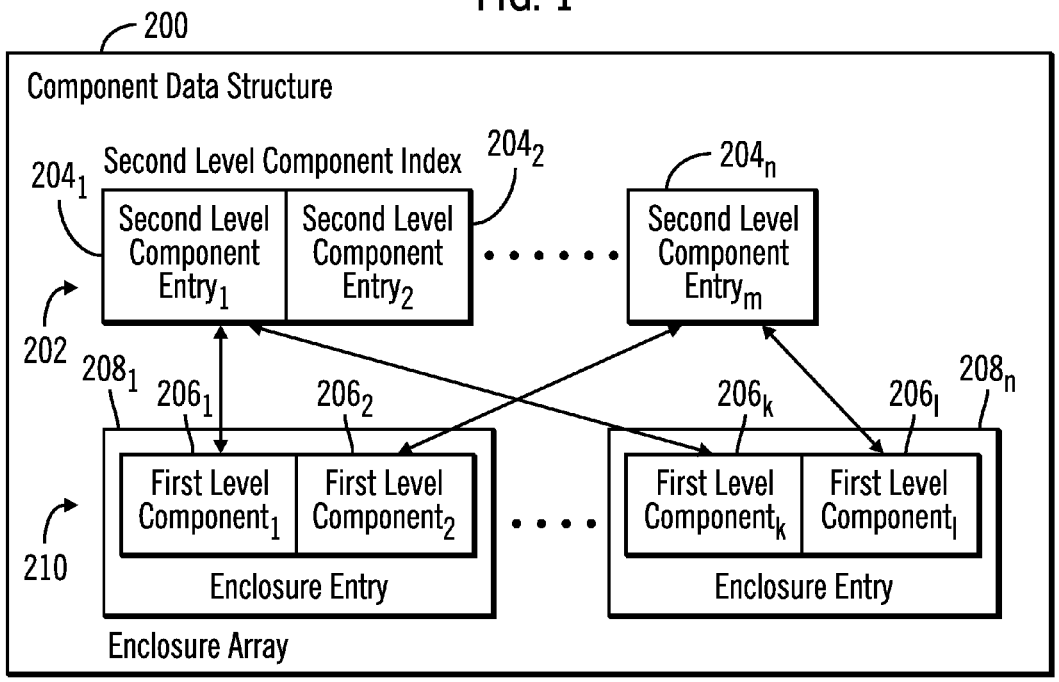
FIG. 2 illustrates an embodiment of a component data structure

FIG. 2 illustrates an embodiment of the component data structure 200, which includes a second level component index 202 having an entry $204_1$, $204_2$ ... $204m$ for each second level component 104a, 104b, where each second level component entry $204_1$, $204_2$ ... $204m$ includes one or more references to first level component entries $206_1$, $206_2$, $206_k$, $206_l$, providing representations of the first level components 102a, 102b, 102c, 102d, which are included in enclosure entries $208_1$ ... $208_n$ in an enclosure array 210. Each enclosure entry $208_1$ ... $208_n$ provides a representation of one of the enclosures 100a, 100b in the environment. The second level component index 202 provides a relationship of first and second level components and the enclosures in which the first level components are contained.

Figure 3:
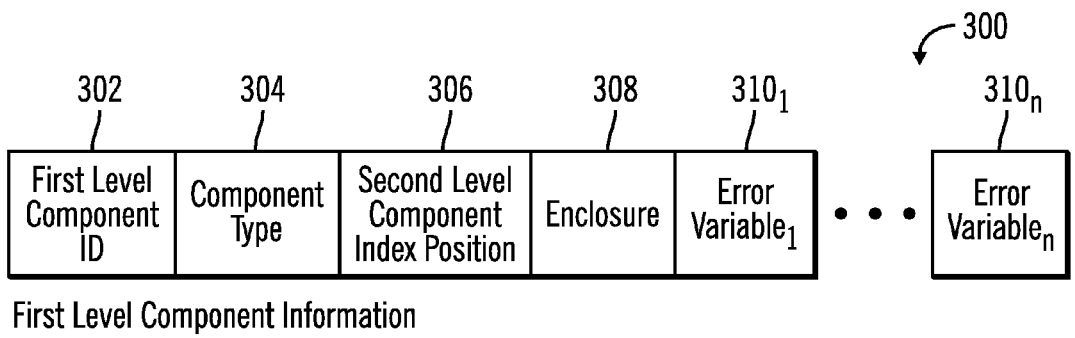
FIG. 3 illustrates an embodiment of first level component information.

FIG. 3 illustrates an embodiment of first level component information 300 maintained for each of the first level components 102a, 102b, 102c, 102d in the enclosures 100a, 100b, represented by first level component entries $206_1$, $206_2$, $206_k$, $206_l$ identified in the component data structure 200. The first level component information 300 includes a first level component ID 302; a component type 304, e.g., vendor, model type, etc.; a second level component index position 306 indicating a location in the second level component index 202 where the reference to the first level component 302 is maintained; an enclosure 308 identifying the enclosure 100a, 100b in which the first level component 302 is maintained; and one or more error variables $310_1$ ... $310_n$ indicating different types of errors. In one embodiment, the error variables may comprise the same type of error for different instances of first level component information 300 maintained for heterogeneous first level components from different vendors. The error variable $310_1$ ... $310_n$ may indicate an error with respect to power or data received from the connected second level component 104a, 104b or an error within the first level component 102a, 102b, 102c, 102d.

The first level component information 300 may be included, referenced or associated in the first level component entries $206_1$, $206_2$, $206_k$, $206_l$.

The component error handler 108 invokes methods of the first level component type interfaces 400 to communicate with the enclosures 100a, 100b to access the first level component error information to update the error variables $310_1$ ... $310_n$ in the first level component information 300 maintained for each identified first level component $206_1$, $206_2$, $206_k$, $206_l$. The enclosures 200a, 200b may maintain error information in a database.

Figure 4:
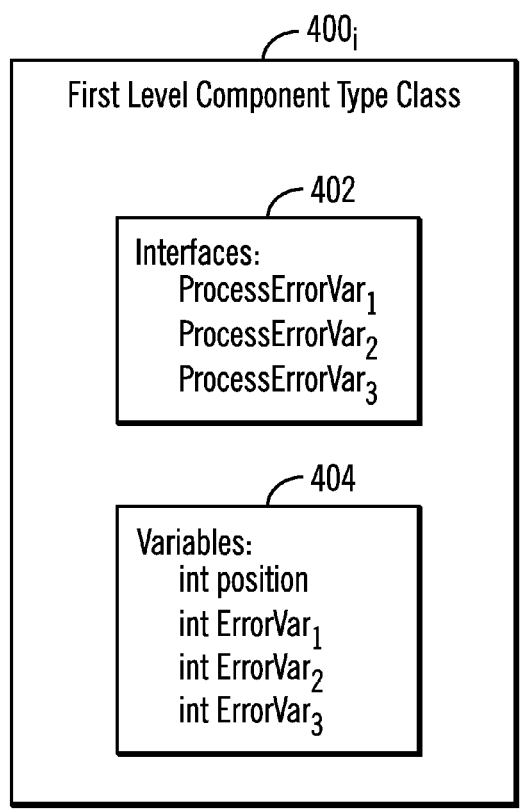
FIG. 4 illustrates an embodiment of a first level component type class interface.

FIG. 4 illustrates an embodiment of an instance $400_1$ of one of the first level component type interfaces 400, which includes a plurality of interfaces 402 used to interact with the enclosure to obtain error information from the first level component for which the interface is called and store the obtained error information in error variables 404 (ErrorVar), which indicate whether a different type of error occurred. The position variable comprises the second level component index position 306. The error variables 404 of the interfaces are generic, and may be based on different error codes used by the heterogeneous first level components 102a, 102b, 102c, 102d.

With the described embodiments, if the different types of first level components $206_1$, $206_2$, $206_k$, $206_l$ and enclosures, which may be heterogeneous and from different vendors, report errors with different codes and formats, then the first level component type interface methods may include specific code to access those errors and update the generic error variables for a particular type of first level component. In this way, the error variable information maintained in the component data structure 200 is common across heterogeneous first level components and enclosures, which may report errors in different formats. Further, if a new type of first level component and enclosure needs to be supported by this system, the vendor need only deploy a new first level component type class for that new first level component type to be supported to allow integration of the new first level type component in the described error analysis embodiments.

Figure 5A:
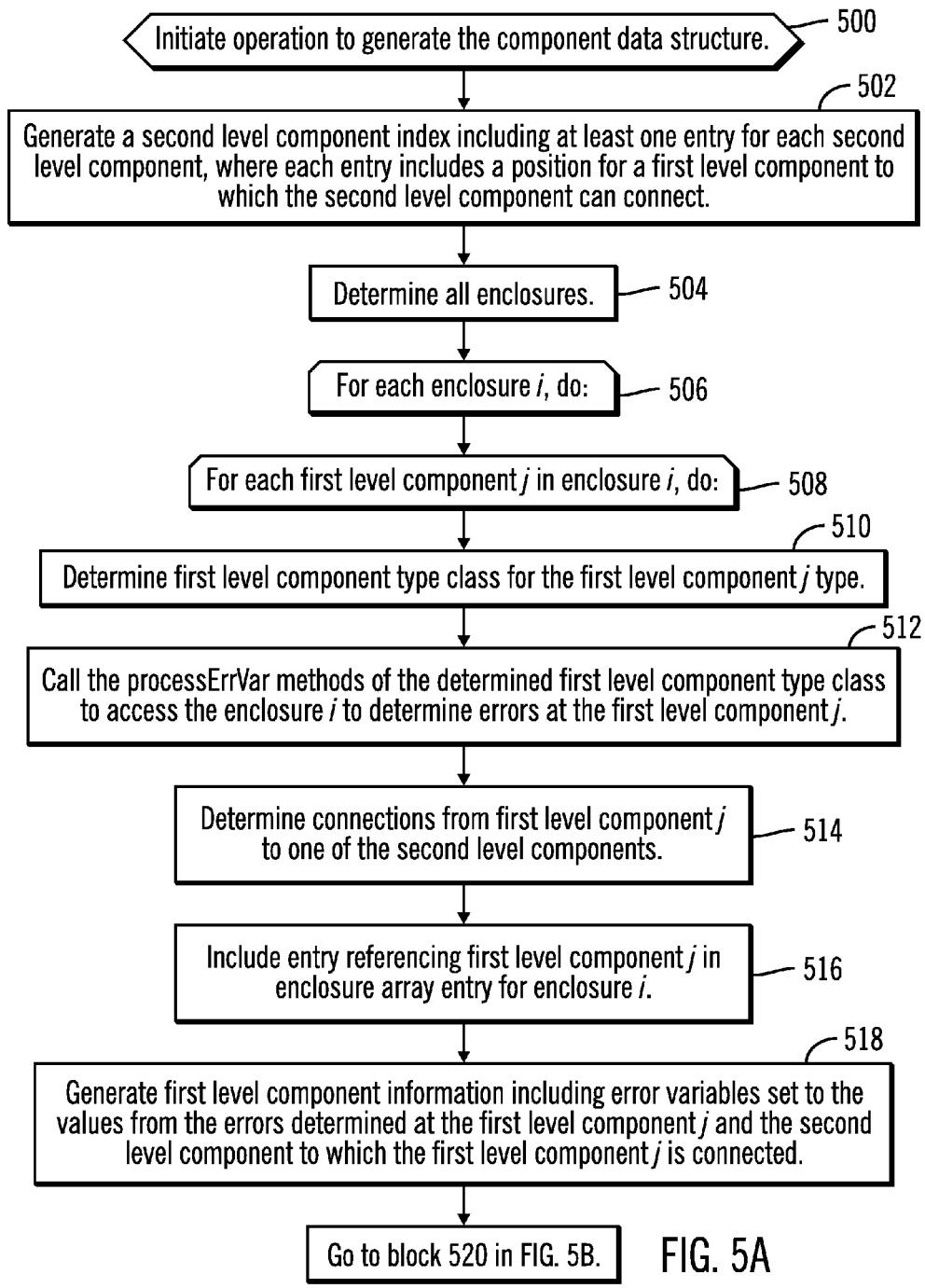
FIGS. 5a and 5b illustrate an embodiment of operations to generate the component data structure.
Figure 5B:
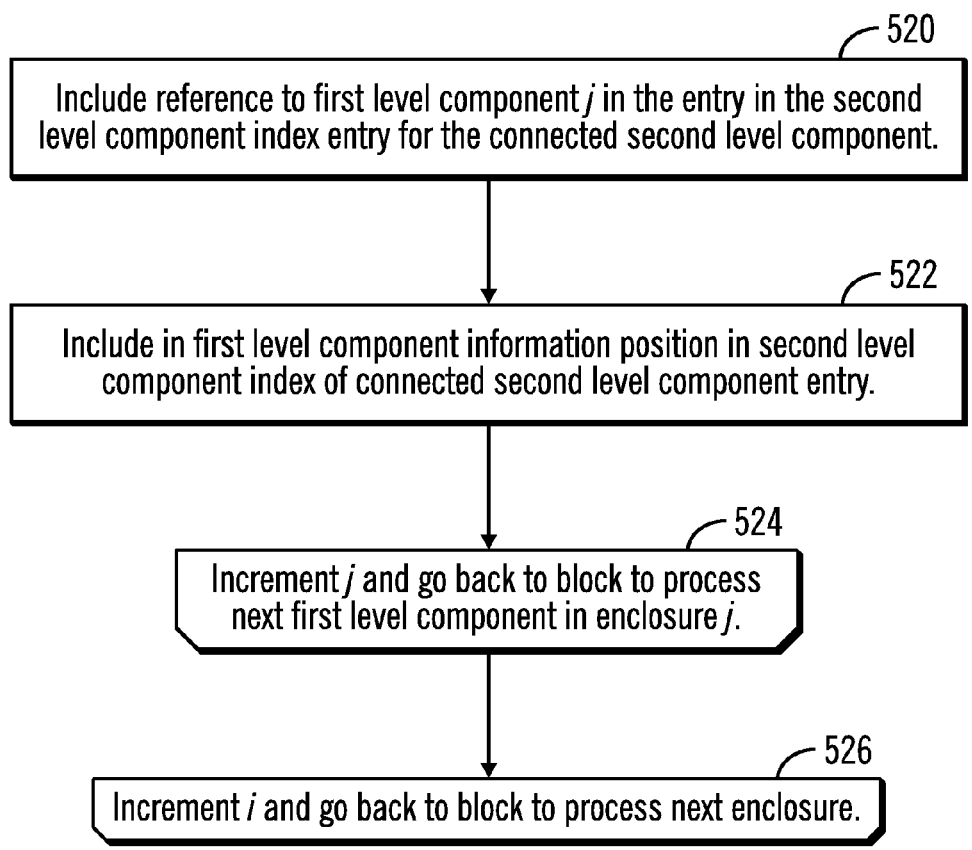

FIGS. 5a and 5b illustrate an embodiment of operations performed by the component error handler 108 to generate the component data structure 200. Upon initiating (at block 500) an operation to generate the component data structure 200, the component error handler 108 generates (at block 502) a second level component index 202 including at least one entry $204_1$, $204_2$ ... $204_n$ for each second level component, where each entry includes a position for a first level component to which the second level component can connect. A determination is made (at block 504) of the enclosures 100a, 100b. A loop of operations at blocks 506 through 526 is performed for each enclosure i. For each enclosure i, a loop of operations is performed at blocks 508 through 524 for each first level component j in enclosure i. At block 510, a determination is made of the first level component type class $400_1$ for the first level component j type. The component error handler 108 calls (at block 512) interface methods 404 to process error variables (processErrVar) of the determined first level component type class to access the enclosure i and determine errors at the first level component j. The errors may be obtained by vendor specific calls for the first level component j types. The component error handler 108 determines (at block 514) connections from first level component j to one of the second level components. An entry referencing first level component j is included (at block 516) in enclosure array entry $206_1$ ... $206_l$ for enclosure i. First level component information 300 is generated (at block 518) including error variables $310_1$ ... $310_n$ set to the values from the errors determined at the first level component j, which result from errors within the first level component j or the second level component to which the first level component j is connected.

With respect to FIG. 5b, a reference to the first level component j is included (at block 520) in the entry $204_1$ ... $206_n$ in the second level component index 200 for the connected second level component. The position 306 in the second level component index 202 of the connected second level component entry is included (at block 522) in first level component information 300.

Figure 6:
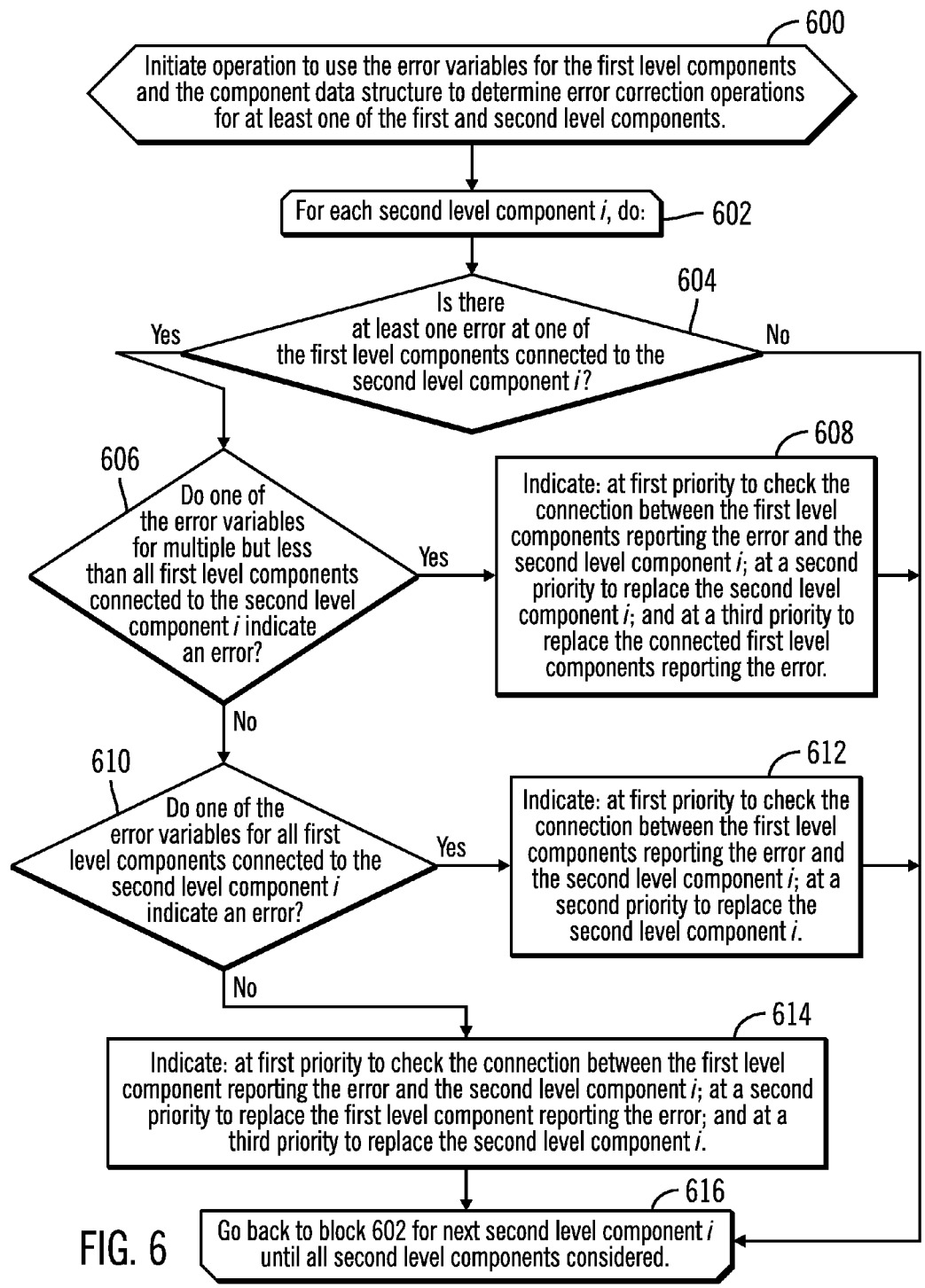
FIG. 6 illustrates an embodiment of operations to determine error correction operations using determined error variables.

FIG. 6 illustrates an embodiment of operations performed by the component error handler 108 to use the component data structure 200 with all the information on the connections and the errors for the different first level components to provide troubleshooting recommendations. Upon initiating (at block 600) the troubleshooting operations, a loop is performed at blocks 602 through 616 for each second level component i identified in the second level component index 202. If (at block 604) there is at least one error in one of the first level components $206_1 \ldots 206_i$ connected to the second level component i, then if (at block 606) one of the error variables $310_1 \ldots 310_n$ indicates an error for multiple but less than all the first level components $206_1 \ldots 206_i$ connected to second level component i, then the component error handler 108 indicates (at block 608) at a first priority to check the connection between the first level components reporting the error and the second level component i; at a second priority to replace the second level component i; and at a third priority to replace the connected first level components reporting the error. Errors in multiple, but less than all the first level components indicates that the connection should first be checked and to replace the second level component, but leave open the possibility for a first level component failure because not all the first level components reported the error.

If (at block 610) the error variables for all the first level components connected to the second level component i indicate the error, then indication is made (at block 612) at first priority to check the connection between the first level components reporting the error and the second level component i and at a second priority to replace the second level component i. From the no branch of block 610, which occurs if only one first level component reported the error, indication is made (at block 614) at first priority to check the connection between the first level component $206_1 \ldots 206_i$ reporting the error and the second level component i; at a second priority to replace the first level component reporting the error; and at a third priority to replace the second level component i.

With the described embodiments, the number of errors at first level components connected to a particular second level component are used to determine the courses of corrective action to take with different priorities, such as check the connection between the first and level components reporting the error, replace the second level component or replace the first level component reporting the error. Further, courses of actions may be indicated with different priorities, where a higher priority course of action is to be performed before a lower priority action as likelier to resolve the problem.

Figure 7:
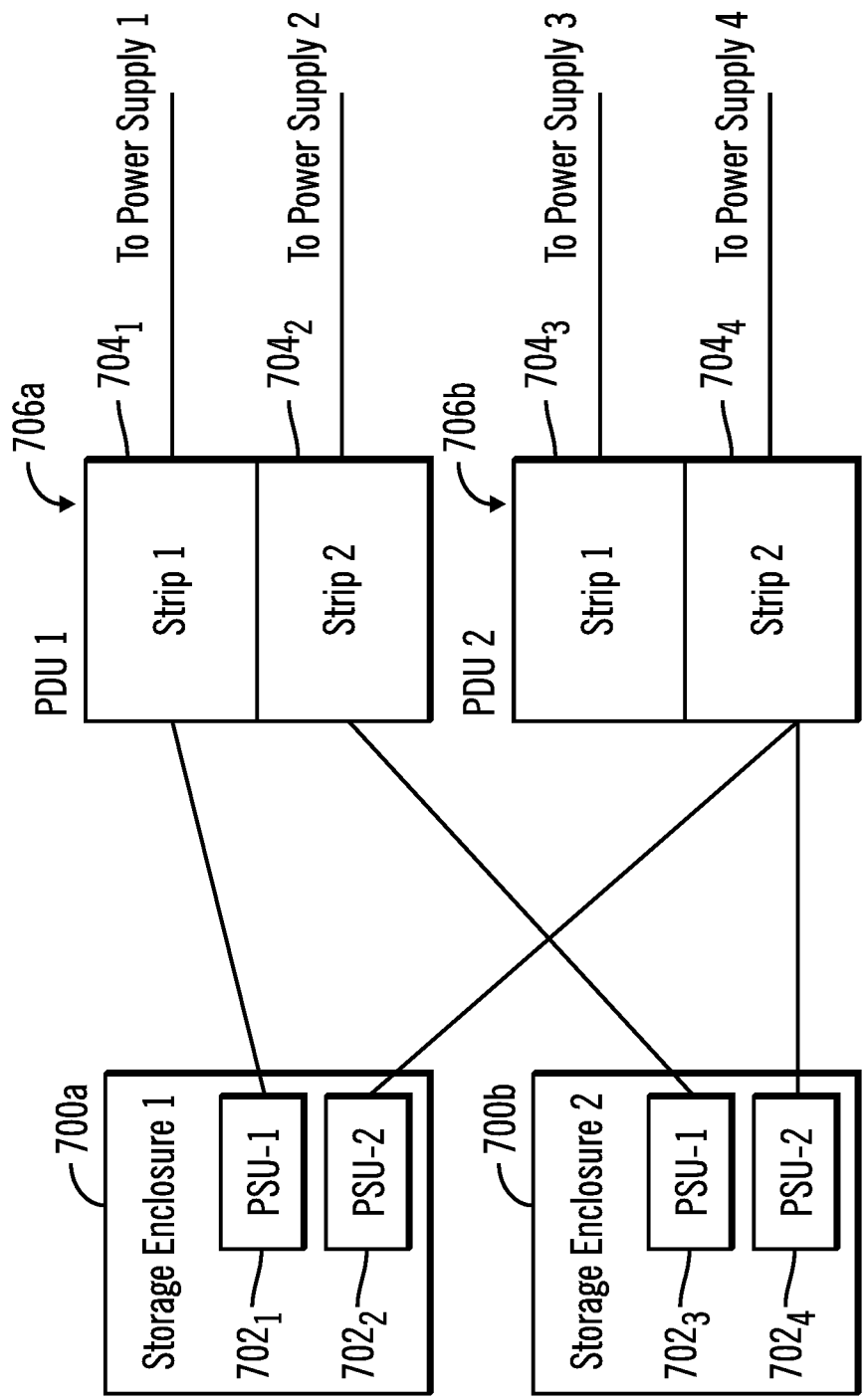
FIG. 7 illustrates an embodiment of a storage enclosure and power supply environment.

FIG. 7 illustrates an embodiment where the enclosures comprise storage enclosures 700a, 700b, each including a power supply unit (PSU) $702_1$, $702_2$, $702_3$, $704_4$ which supply power to the enclosures 700a, 700b in which they are included. Each power supply unit $702_1$, $702_2$, $702_3$, $702_4$ is connected to a strip $704_1$, $704_2$, $704_3$, $704_4$ in one power distribution unit (PDU) 706a, 706b. In this way, the PSUs $702_1$, $702_2$, $702_3$, $704_4$ function as the above described first level components and the PDUs 706a, 706b function as the above described second level components, with further strip $704_1$, $704_2$, $704_3$, $704_4$ sub-components, where a strip comprises a power outlet of the PDUs 706a, 706b.

Figure 8:
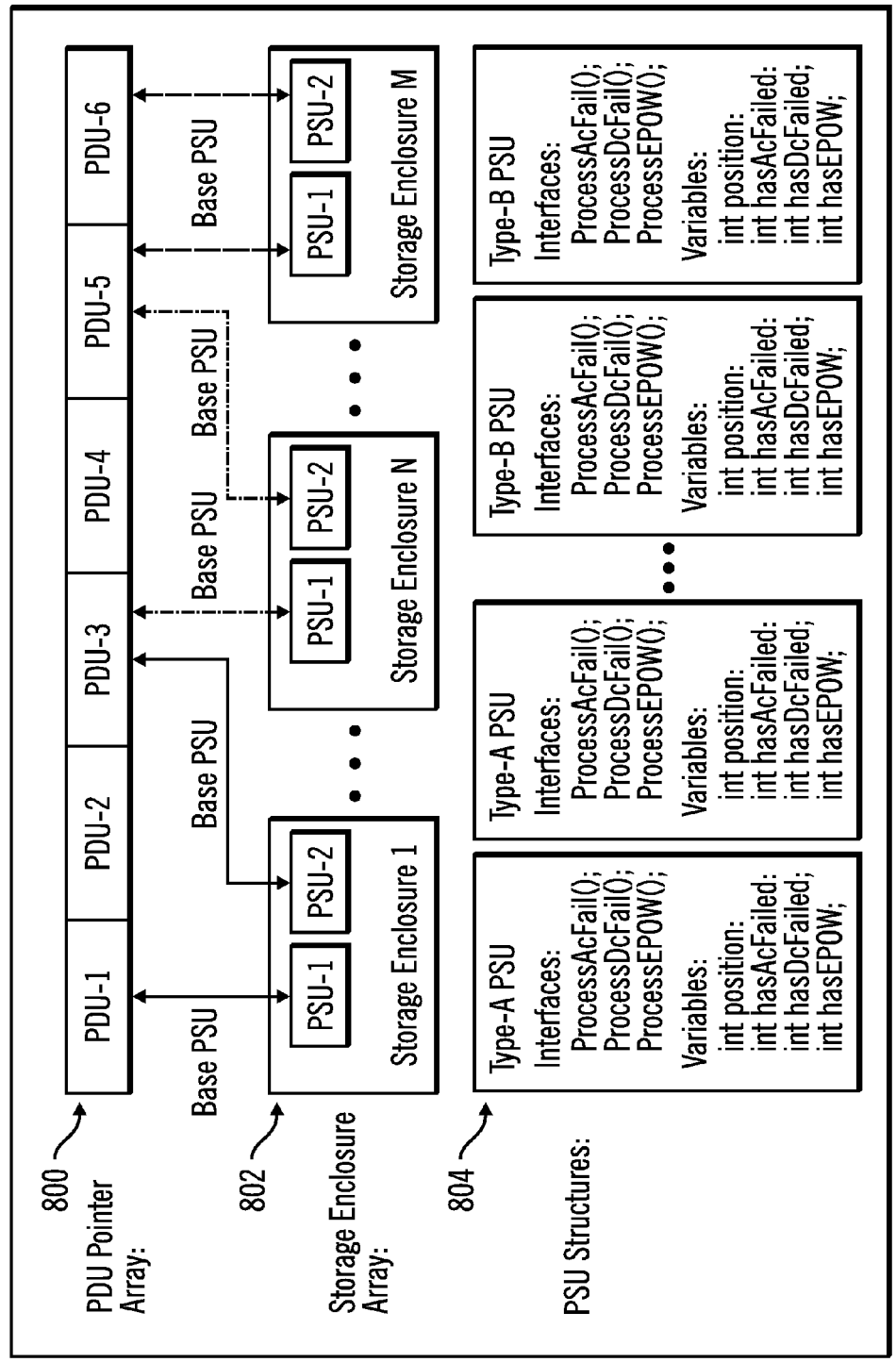
FIG. 8 illustrates an embodiment of the component data structure and component type class interfaces for the power supply environment.

FIG. 8 illustrates an embodiment of the data structure components for the power supply environment of FIG. 7 as including a PDU pointer array 800 having entries for PDUs that reference connected PSUs in the storage enclosure array 802. Further, FIG. 8 provides an embodiment of a format of the PSU type class interfaces 804, which include methods to process different types of power supply failures at the PSU and/or connected PDU, including a process ACfailed that queries the enclosure to determine whether there is an error with the supply of AC electrical charge from the PDU 706a, 706b; a process DCfailed that queries the enclosure 700a, 700b to determine whether there was a failure in the DC output from the PSU $702_1$, $702_2$, $702_3$, $704_4$ of the type for the interface 804; and a process EPOW that queries the enclosure 700a, 700b to determine whether there was an early power-off warning (EPOW) at the PSU $702_1$, $702_2$, $702_3$, $704_4$ or midplane in the enclosure 700a, 700b. The PSU type class interfaces 804 further include the error variables corresponding to the errors gathered by the interface methods ACFail, DCFail, and EPOW.

In certain embodiments, the AC failed error comprises a PDU power failure because the source of the error is in the PDU unit 706a, 706b and the DC failed error comprises a PSU power failure variable because it indicates a failure of the PSU power operations.

With the described embodiment 4s, if the different types of PSUs $702_1$, $702_2$, $702_3$, $704_4$ and enclosures 700a, 700b, which may be from different vendors, report errors with different codes and formats, then the PSU type interface may include specific code to access those errors and update the generic error variables. In this way, the information maintained in the component data structure is common across heterogeneous PSUs $702_1$, $702_2$, $702_3$, $704_4$ and enclosures 700a, 700b, which may report errors using different codes and formats.

Figure 9:
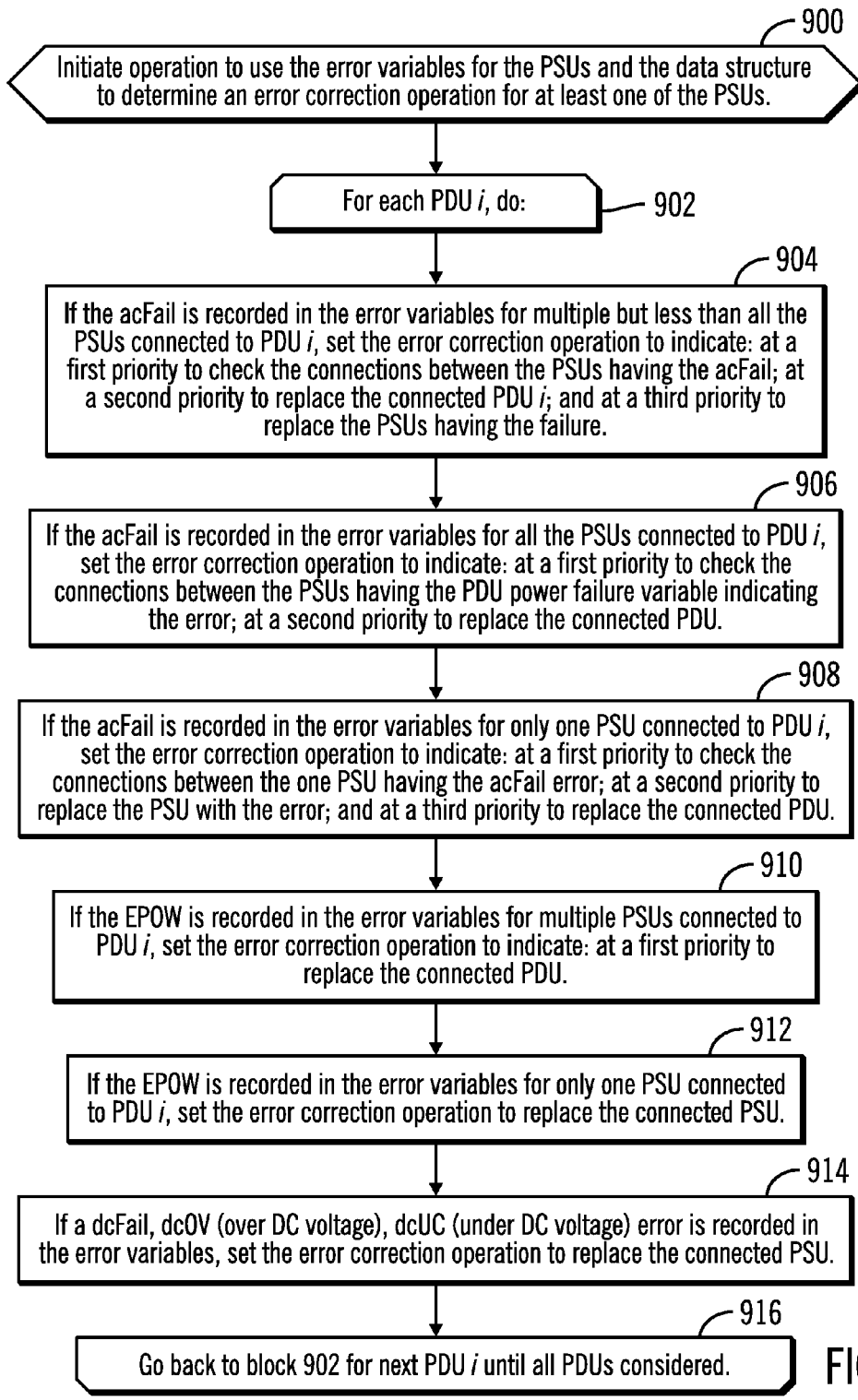
FIG. 9 illustrates an embodiment of operations to determine error correction and troubleshooting operations for a power supply environment.

FIG. 9 illustrates an embodiment of operations performed by the component error handler 108 in the power supply environment of FIG. 7 to determine recommended error correction operations. Upon initiating (at block 900) an operation to user error variables for the PSUs $702_1$, $702_2$, $702_3$, $704_4$ to determine an error correction operation, a loop of operations is performed at blocks 902 through 916 for each PDU i. If (at block 904) the acFail error was recorded for multiple but less than all the PSUs $702_1$, $702_2$, $702_3$, $704_4$ connected to PDU i, then the error correction operation is set to indicate: at a first priority to check the connections between the PSUs $702_1$, $702_2$, $702_3$, $704_4$ having the acFail; at a second priority to replace the connected PDU i; and at a third priority to replace the PSUs $702_1$, $702_2$, $702_3$, $704_4$ having the failure.

If (at block 906) the acFail error is recorded in the error variables for all the PSUs $702_1$, $702_2$, $702_3$, $704_4$ connected to PDU i, then the error correction operation is set to indicate: at a first priority to check the connections between the PSUs $702_1$, $702_2$, $702_3$, $704_4$ having the PDU power failure variable indicating the error and at a second priority to replace the connected PDU i.

If (at block 908) the acFail error is recorded in the error variables for only one PSU $702_1$, $702_2$, $702_3$, $704_4$ connected to PDU i, then the error correction operation is set to indicate: at a first priority to check the connections between the one PSU $702_1$, $702_2$, $702_3$, $704_4$ having the acFail error; at a second priority to replace the PSU $702_1$, $702_2$, $702_3$, $704_4$ with the error; and at a third priority to replace the connected PDU i.

If (at block 910) the EPOW is recorded in the error variables for multiple PSUs $702_1$, $702_2$, $702_3$, $704_4$ connected to PDU i, then the error correction operation is set to indicate: at a first priority to replace the connected PDU.

If (at block 912) the EPOW is recorded in the error variables of only one PSU $702_1$, $702_2$, $702_3$, $704_4$ connected to PDU i, then the error correction operation is set to indicate to replace the PSU $702_1$, $702_2$, $702_3$, $704_4$ having the EPOW.

With regard to additional error types, if a dcFail, dcOV (over DC voltage), dcUC (under DC voltage) error occurs at any one of the PSU $702_1$, $702_2$, $702_3$, $704_4$, then the error correction operation is set to indicate to replace the connected PSU producing that error.

After the error correction operation is set, the component error handler 108 may then transmit the suggested error correction procedures with their different priorities to an administrator via a display monitor, electronic message, etc.

The above error handling operations at different priorities provide examples of error handling operations that may be performed and in additional embodiments different or additional error handling operations at different priorities than those described may be indicated.

Described embodiments provide techniques to gather and collect errors across first level type components in different enclosures, which may by heterogeneous components from different vendors, and store the errors in generic variables across all the different types of first level components. Further, a data structure is generated having information on the gathered error variables for the first level components and having connection information on the connection of the first level components and the enclosures in which they are included. This connection and error variable information may be used to determine the error correction operations to suggest to the administrator to implement. Further, the determined course of action may be based on the number errors of different first level components connected to a particular second level component.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, j, k, l, m, n, are used herein to denote a variable number of instances of an element, which may represent the same or different values, and may represent the same or different value when used with different or the same elements in different described instances.

Figure 10:
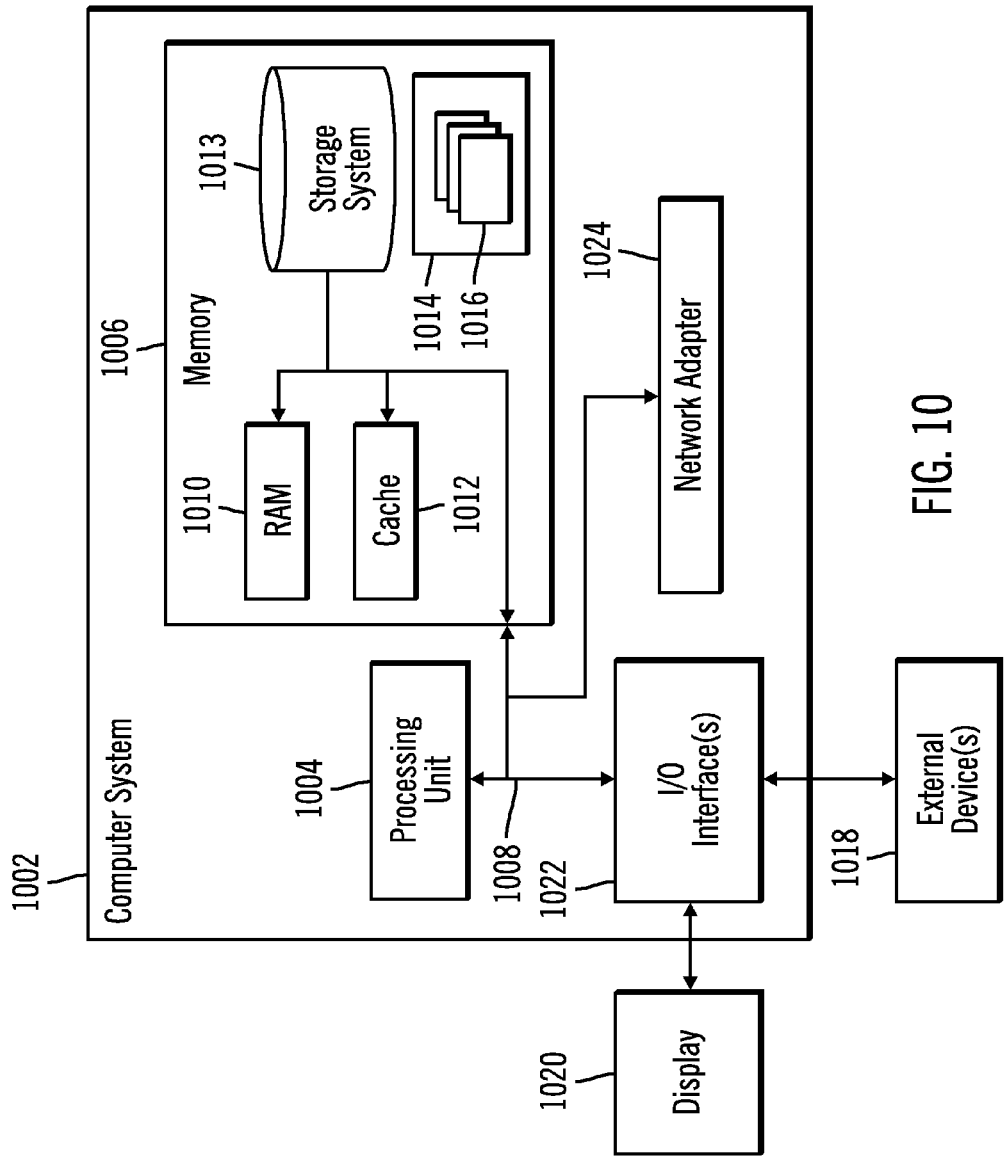
FIG. 10 illustrates an embodiment of a computing environment in which embodiments may be implemented.

FIG. 10 illustrates an embodiment of a computer system 1002 which may comprise an implementation of the controllers 104a, 104b. Computer node 1002 is only one example of a suitable computing node and is not intended to suggest any limitation as to the scope of use or functionality of embodiments of the invention described herein. Regardless, computer node 1002 is capable of being implemented and/or performing any of the functionality set forth hereinabove.

The computer node 1002 is operational with numerous other general purpose or special purpose computing system environments or configurations. Examples of well-known computing systems, environments, and/or configurations that may be suitable for use with computer node 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1002 may be described in the general context of computer system executable instructions, such as program modules, being executed by a computer system. Generally, program modules may include routines, programs, objects, components, logic, data structures, and so on that perform particular tasks or implement particular abstract data types. Computer node 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer node 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004.

Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1002 typically includes a variety of computer system readable media. Such media may be any available media that is accessible by computer node 1002, and it includes both volatile and non-volatile media, removable and non-removable media, and may be used for storing the programs and data used by the programs.

System memory 1006 can include computer system readable media in the form of volatile memory, such as random access memory (RAM) 1010 and/or cache memory 1012. Computer node 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules etc., and program data. Each of the operating system, one or more application programs, other program modules, and program data or some combination thereof, may include an implementation of a networking environment. Program modules 1016 generally carry out the functions and/or methodologies of embodiments of the invention as described herein.

Computer node 1002 may also communicate with one or more external devices 1018 such as a keyboard, a pointing device, a display 1020, etc.; one or more devices that enable a user to interact with the computer node 1002; and/or any devices (e.g., network card, modem, etc.) that enable computer system/server 1002 to communicate with one or more other computing devices. Such communication can occur via Input/Output (I/O) interfaces 1022. Still yet, computer node 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining error handling operations at enclosures, wherein each enclosure includes at least one first level component, wherein each of first level components in each of the enclosures is connected to at least one second level component of second level components, the computer program product comprising a computer readable storage medium having computer readable program code embodied therein that when executed performs operations, the operations comprising:

for each of the first level components, performing:
communicating with the enclosure including the first level component to determine errors at the first level component and a connection between the first level component to one of the second level components;
setting an error variable to indicate whether an error corresponding to the error variable was reported at the first level component; and
using error variables for the first level components to determine an error correction operation with respect to at least one of the first level component and a connected second level component for those first level components having the error variables indicating errors.

2. The computer program product of claim 1, wherein the first level components comprise heterogeneous components that report different error codes for a same type of error, wherein the error variables are set based on the reported different error codes from the first level components, and wherein the error variables are same for the heterogeneous components.

3. The computer program product of claim 1, wherein the using the error variables for the first level components to determine the error correction operation comprises:
setting the error correction operation to indicate at a first priority to check the connection between the first level components having the error variables indicating the error and the connected second level component and to indicate at a second priority to replace the connected second level component in response to determining that the error variables indicate the error for multiple of the first level components connected to one second level component.

4. The computer program product of claim 3, wherein the determining the error correction operation comprises:
setting the error correction operation to indicate at a first priority to check the connection between the first level component having the error variable indicating the error and the connected second level component and to indicate at a second priority to replace the first level component in response to determining that the error is indicated in the error variable of only one of the first level components connected to the second level component.

5. The computer program product of claim 1, wherein the first level components comprise power supply units (PSUs) to supply power to the enclosures including the PSUs and the second level components comprise power distribution units (PDUs) to supply power to the PSUs, wherein one of the error variables for each of the first level components comprises a PDU power failure variable indicating a failure of power supply from a connected PDU, wherein the determining the error correction operation comprises:
setting the error correction operation to indicate at a first priority to check connections between the PSUs having the PDU power failure variable indicating the error and the connected PDU and indicate at a second priority to replace the connected PDU in response to determining that the PDU power failure variables of multiple of the PSUs connected to one of the PDUs indicates the error; and
setting the error correction operation to indicate at the first priority to check the connection between a PSU having the PDU power failure variable indicating the error and the connected PDU and indicate at a second priority to replace the PSU in response to determining that the PDU power failure variable of only one of the PSUs connected to one of the PDUs indicates the error.

6. The computer program product of claim 5, wherein one of the error variables for each of the first level components comprises a PSU power failure variable indicating a failure of power supply at the PSU, wherein the determining the error correction operation comprises:
  setting the error correction operation to indicate to replace the PSU having the PSU power failure variable indicating the error in response to determining the PSU power failure variable of one of the PSUs indicates an error.

7. The computer program product of claim 5, wherein one of the error variables for each of the first level components comprises an Early Power Off Warning (EPOW) variable indicating reporting of an EPOW event at the first level component or enclosure, wherein the determining the error correction operation comprises:
  setting the error correction operation to indicate to replace the connected PDU in response to determining that the EPOW variable for multiple of the PSUs connected to one of the PDUs indicates the EPOW event; and
  setting the error correction operation to indicate to replace the PSU having the EPOW variable indicating the EPOW event in response to only one of the PSUs having the EPOW variable indicating the EPOW event.

8. The computer program product of claim 1, wherein the operations further comprise:
  providing a plurality of class interfaces, wherein each of the class interfaces are for different first level component types, wherein a plurality of the first level component types report errors with different error codes;
  for each of the first level components in each of the enclosures, performing:
    calling methods of the class interface for a first level component type of the first level component to access the enclosure to determine errors with respect to the first level component in the enclosure;
    determining connections from the first level component to one of the second level components to which the first level component connects; and
    updating at least one error variable of the class interface indicating any determined errors at the first level component, wherein the error variables in class interface types are common across the class interface types.

9. A system for determining error handling operations at enclosures, wherein each enclosure includes at least one first level component, wherein each of first level components in each of the enclosures is connected to at least one second level component of second level components, comprising:
  a processor; and
  a computer readable storage medium including program code that when executed by the processor, performs:
    for each of the first level components, performing:
      communicating with the enclosure including the first level component to determine errors at the first level component and a connection between the first level component to one of the second level components;
      setting an error variable to indicate whether an error corresponding to the error variable was reported at the first level component; and
      using error variables for the first level components to determine an error correction operation with respect to at least one of the first level component and a connected second level component for those first level components having error variables indicating errors.

10. The system of claim 9, wherein the first level components comprise heterogeneous components that report different error codes for a same type of error, wherein the error variables are set based on the reported different error codes from the first level components, and wherein the error variables are same for the heterogeneous components.

11. The system of claim 9, wherein the operations further comprise:
  generating a second level component index including an entry for each second level component, wherein each entry for the second level components identifies first level component information for each first level component connected to the second level component of the entry, wherein the first level component information for each of the first level components includes the error variables for the first level component.

12. The system of claim 9, wherein the using the error variables for the first level components to determine an error correction operation comprises:
  setting the error correction operation to indicate at a first priority to check the connection between the first level components having the error variables indicating the error and the connected second level component and to indicate at a second priority to replace the connected second level component in response to determining that the error variables indicate the error for multiple of the first level components connected to one second level component.

13. The system of claim 9, wherein the first level components comprise power supply units (PSUs) to supply power to the enclosures including the PSUs and the second level components comprise power distribution units (PDUs) to supply power to the PSUs, wherein one of the error variables for each of the first level components comprises a power distribution unit (PDU) power failure variable indicating a failure of power supply from a connected PDU, wherein the determining the error correction operation comprises:
  setting the error correction operation to indicate at a first priority to check connections between the PSUs having the PDU power failure variable indicating the error and a connected PDU and indicate at a second priority to replace the connected PDU in response to determining that the PDU power failure variables of multiple of the PSUs connected to one of the PDUs indicates the error; and
  setting the error correction operation to indicate at the first priority to check the connection between a PSU having the PDU power failure variable indicating the error and the connected PDU and indicate at a second priority to replace the PSU in response to determining that the PDU power failure variable of only one of the PSUs connected to one of the PDUs indicates the error.

14. The system of claim 9, wherein the operations further comprise:
  providing a plurality of class interfaces, wherein each of the class interfaces are for different first level component types, wherein a plurality of the first level component types report errors with different error codes;
  for each of the first level components in each of the enclosures, performing:
    calling methods of the class interface for a first level component type of the first level component to access the enclosure to determine errors with respect to the first level component in the enclosure;

determining connections from the first level component to one of the second level components to which the first level component connects; and updating at least one error variable of the class interface indicating any determined errors at the first level component, wherein the error variables in class interface types are common across the class interface types.

15. A method for determining error handling operations at enclosures, wherein each enclosure includes at least one first level component, wherein each of first level components in each of the enclosures is connected to at least one second level component of second level components, comprising:

for each of the first level components, performing:

communicating with the enclosure including the first level component to determine errors at the first level component and a connection between the first level component to one of the second level components;

setting an error variable to indicate whether an error corresponding to the error variable was reported at the first level component; and using error variables for the first level components to determine an error correction operation with respect to at least one of the first level component and a connected second level component for those first level components having error variables indicating errors.

16. The method of claim 15, wherein the first level components comprise heterogeneous components that report different error codes for a same type of error, wherein the error variables are set based on the reported different error codes from the first level components, and wherein the error variables are same for the heterogeneous components.

17. The method of claim 15, further comprising:

generating a second level component index including an entry for each second level component, wherein each entry for the second level components identifies first level component information for each first level component connected to the second level component of the entry, wherein the first level component information for each of the first level components includes the error variables for the first level component.

18. The method of claim 15, wherein using the error variables for the first level components to determine the error correction operation comprises:

setting the error correction operation to indicate at a first priority to check the connection between the first level components having the error variables indicating the error and the connected second level component and to indicate at a second priority to replace the connected second level component in response to determining that the error variables indicate the error for multiple of the first level components connected to one second level component.

19. The method of claim 15, wherein the first level components comprise power supply units (PSUs) to supply power to the enclosures including the PSUs and the second level components comprise power distribution units (PDUs) to supply power to the PSUs, wherein one of the error variables for each of the first level components comprises a PDU power failure variable indicating a failure of power supply from a connected PDU, wherein the determining the error correction operation comprises:

setting the error correction operation to indicate at a first priority to check the connections between the PSUs having the PDU power failure variable indicating the error and a connected PDU and indicate at a second priority to replace the connected PDU in response to determining that the PDU power failure variables of multiple of the PSUs connected to one of the PDUs indicates the error; and setting the error correction operation to indicate at the first priority to check connection between a PSU having the PDU power failure variable indicating the error and the connected PDU and indicate at a second priority to replace the PSU in response to determining that the PDU power failure variable of only one of the PSUs connected to one of the PDUs indicates the error.

20. The method of claim 15, further comprising:

providing a plurality of class interfaces, wherein each of the class interfaces are for different first level component types, wherein a plurality of the first level component types report errors with different error codes;

for each of the first level components in each of the enclosures, performing:

calling methods of the class interface for a first level component type of the first level component to access the enclosure to determine errors with respect to the first level component in the enclosure;

determining connections from the first level component to one of the second level components to which the first level component connects; and updating at least one error variable of the class interface indicating any determined errors at the first level component, wherein the error variables in class interface types are common across the class interface types.

* * * * *